US012494605B2

(12) United States Patent
Li et al.

(10) Patent No.: US 12,494,605 B2
(45) Date of Patent: Dec. 9, 2025

(54) CONNECTOR AND CONNECTOR ASSEMBLY

(71) Applicants: Tyco Electronics (Shanghai) Co. Ltd, Shanghai (CN); Tyco Electronics Japan G.K., Kawasaki (JP)

(72) Inventors: Xinlei (Tony) Li, Shanghai (CN); Fengping (Alex) Xu, Shanghai (CN); Junya Tsuji, Kawasaki (JP)

(73) Assignees: Tyco Electronics (Shanghai) Co., Ltd., Shanghai (CN); Tyco Electronics Japan G.K., Kawasaki (JP)

( * ) Notice: Subject to any disclaimer, the term of this patent is extended or adjusted under 35 U.S.C. 154(b) by 701 days.

(21) Appl. No.: 17/743,625

(22) Filed: May 13, 2022

(65) Prior Publication Data

US 2022/0368070 A1 Nov. 17, 2022

(30) Foreign Application Priority Data

May 13, 2021 (CN) ........................ 202110521860.X

(51) Int. Cl.
*H01R 13/627* (2006.01)
*H01R 13/405* (2006.01)
*H01R 13/502* (2006.01)
*H01R 13/629* (2006.01)

(52) U.S. Cl.
CPC ....... *H01R 13/6273* (2013.01); *H01R 13/405* (2013.01); *H01R 13/502* (2013.01); *H01R 13/629* (2013.01)

(58) Field of Classification Search
CPC .. H01R 13/629; H01R 13/405; H01R 13/502; H01R 24/84; H01R 24/86; H01R 24/00; H01R 24/38; H01R 24/52; H01R 4/24; H01R 13/6273
USPC ........................................................ 439/157
See application file for complete search history.

(56) References Cited

U.S. PATENT DOCUMENTS

| | | | |
|---|---|---|---|
| 4,330,164 A | 5/1982 | Pittman et al. | |
| 8,147,254 B2 | 4/2012 | Shuey et al. | |
| 8,845,351 B2 | 9/2014 | Johnson et al. | |
| 9,831,605 B2 | 11/2017 | Buck et al. | |
| 10,522,948 B2 * | 12/2019 | Cho | H01R 13/6471 |
| 10,868,396 B1 * | 12/2020 | Daily | H01R 13/50 |

(Continued)

FOREIGN PATENT DOCUMENTS

| | | |
|---|---|---|
| CN | 202585882 U1 | 12/2012 |
| CN | 103378434 A | 10/2013 |
| CN | 211789865 U | 10/2020 |

OTHER PUBLICATIONS

Chinese Office Action dated May 16, 2025 with English translation, corresponding to Application No. 202110521860.X, 11 pages.

*Primary Examiner* — Tulsidas C Patel
*Assistant Examiner* — Jeffrey Mountain
(74) *Attorney, Agent, or Firm* — Barley Snyder

(57) ABSTRACT

A housing of a connector includes a body and a guiding structure. The body has a first end and a second end opposite the first end in a length direction. The guiding structure has a guiding groove at the first end of the body and extending perpendicular to the body and a guiding post at the second end of the body. The guiding groove is complementary to the guiding post and has a shape corresponding to and shaped to receive the guiding post.

22 Claims, 3 Drawing Sheets

(56) References Cited

U.S. PATENT DOCUMENTS

| | | | | |
|---|---|---|---|---|
| 2012/0258626 | A1* | 10/2012 | Johnson | H01R 13/518 174/59 |
| 2014/0017957 | A1* | 1/2014 | Horchler | H01R 13/631 439/680 |
| 2016/0308316 | A1* | 10/2016 | Hashiguchi | H01R 24/84 |

* cited by examiner

CONNECTOR AND CONNECTOR ASSEMBLY

CROSS-REFERENCE TO RELATED APPLICATIONS

This application claims the benefit of the filing date under 35 U.S.C. § 119(a)-(d) of Chinese Patent Application No. 202110521860.X, filed on May 13, 2021.

FIELD OF THE INVENTION

Embodiments of the present disclosure generally relate to a connector and a connector assembly including the connector.

BACKGROUND

In the related art, a connector assembly is usually used to realize the transmission of signals between two printed circuit boards (PCB). The connector assembly mainly includes two connectors of different structure, the two connectors are mounted on two printed circuits, respectively, and then the two connectors are mated together to achieve the transmission of signals between the two printed circuit boards. Typically, the connector assembly is provided with a guiding structure to meet the guiding effects in all directions when the connector assembly is assembled. However, the guiding structure occupies a large space, so that the guiding structure in the related art cannot be arranged in the case of limited design space of the printed circuit boards.

SUMMARY

A housing of a connector includes a body and a guiding structure. The body has a first end and a second end opposite the first end in a length direction. The guiding structure has a guiding groove at the first end of the body and extending perpendicular to the body and a guiding post at the second end of the body. The guiding groove is complementary to the guiding post and has a shape corresponding to and shaped to receive the guiding post.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
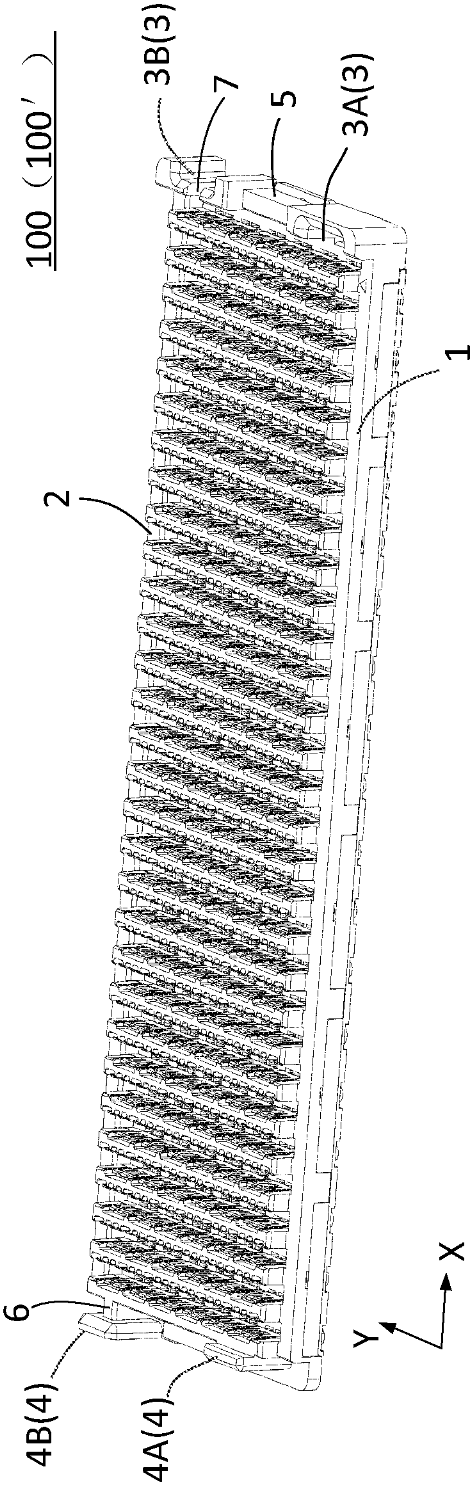
FIG. 1 is a perspective view of a connector according to an embodiment.

Although the present disclosure will be fully described with reference to the accompanying drawings containing embodiments of the present disclosure, it should be understood that those skilled in the art may modify the present disclosure and obtain the technical effect of the present disclosure. Therefore, it is understood that the description is a broad disclosure for those skilled in the art and does not limit the invention to the exemplary embodiments described in the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 2:
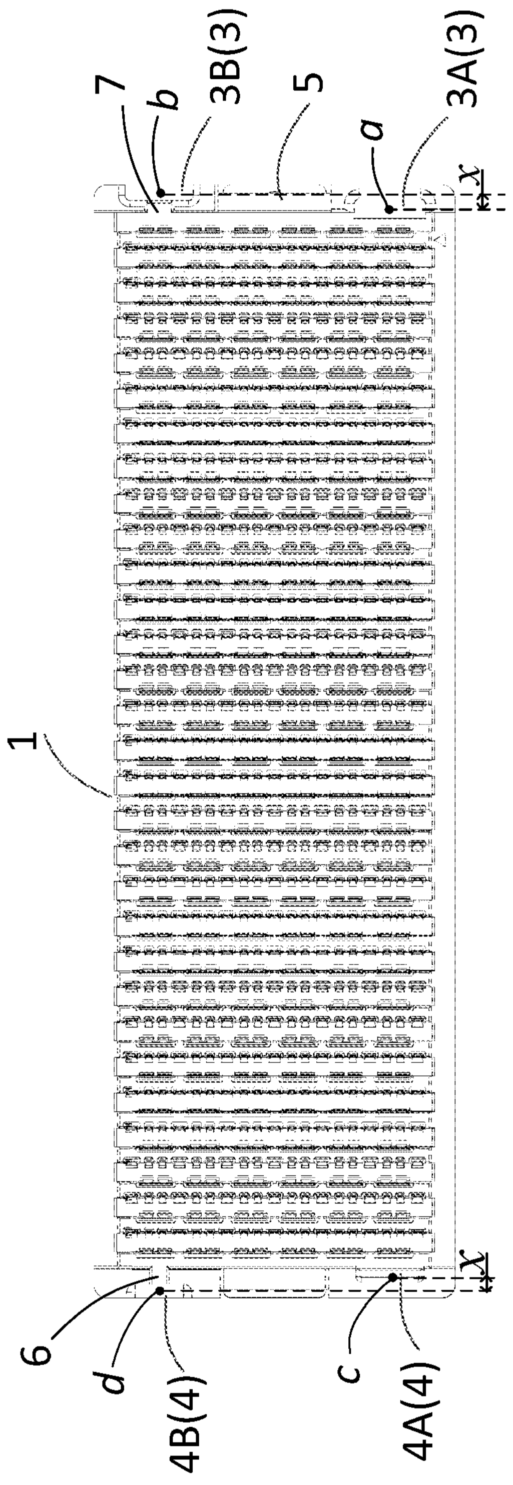
FIG. 2 is a top view of the connector.
Figure 3:
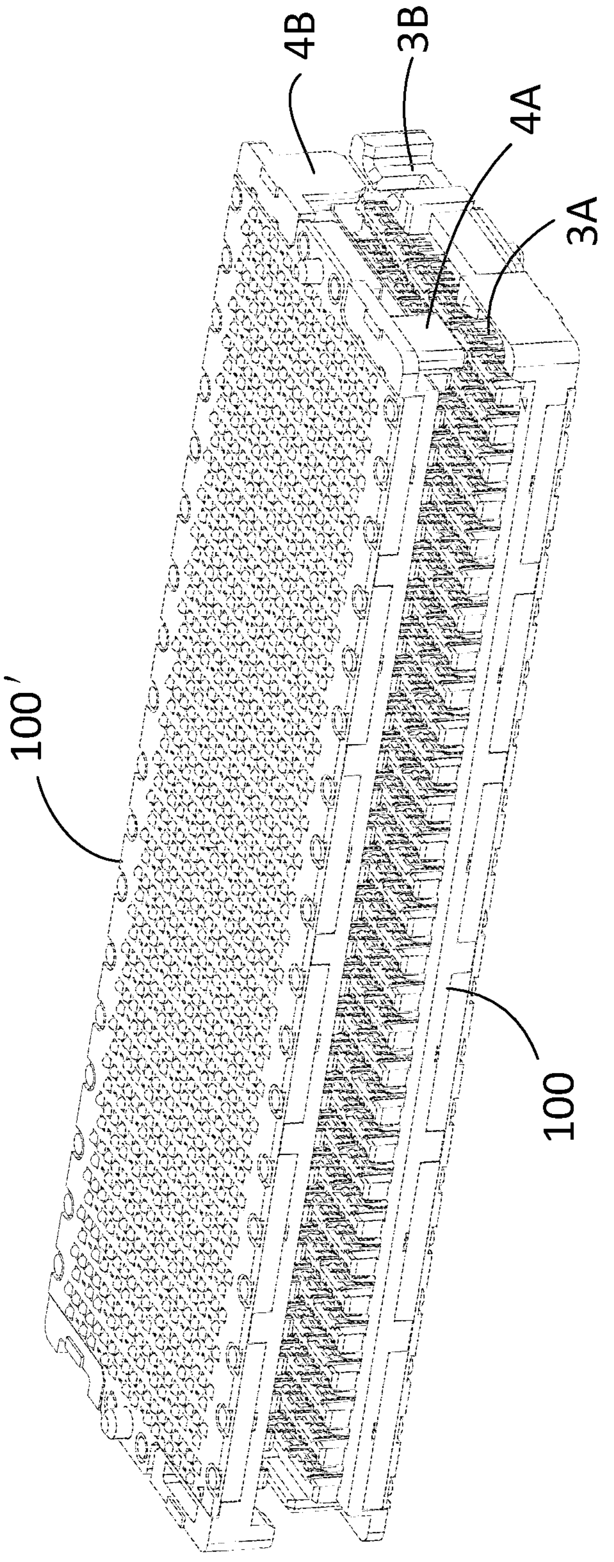
FIG. 3 is a perspective view of a connector assembly according to an embodiment.

As shown in FIGS. 1-3, the connector 100, 100' according to an exemplary embodiment of the present disclosure includes a housing made of insulation material and a terminal 2 held in the housing. The housing includes a body 1 and at least one guiding structure. The body 1 has a first end along a length direction X thereof and a second end opposite to the first end.

Each guiding structure includes a guiding groove 3 and a guiding post 4, as shown in FIG. 1-3. The guiding groove 3 is formed at the first end of the body 1 and extends in a direction perpendicular to the body 1. The guiding post 4 is formed at the second end of the body 1. When the connector 100 is mated with another connector 100' having exactly the same structure as the connector 100, the guiding post 4 of the connector 100 is adapted to engage with the guiding groove 3 of the another connector 100', and the guiding groove 3 of the connector 100 is adapted to engage with the guiding post 4 of the another connector 100', so as to achieve a guiding effect. Since the guiding post 4 and guiding groove 3 adopt a staggered design, space is saved. In addition, since the connector 100 has a hermaphroditic structure, there is no need to manufacture two different connectors for mating, which reduces the manufacturing cost of the connector 100.

In the embodiment shown in FIG. 1-3, the guiding groove 3 includes a first guiding groove 3A and a second guiding groove 3B; the first guiding groove 3A and the second guiding groove 3B are arranged in a width direction Y of the body 1. In this way, the two guiding grooves 3A, 3B displaced with each other in the width direction Y can achieve the guiding effect in the width direction Y.

As shown in FIG. 2, a projection of a central axis a of the first guiding groove 3A in the length direction X and a projection of a central axis b of the second guiding groove 3B in the length direction X are staggered from each other, for example at a distance x in the length direction X. Correspondingly, a projection of a central axis c of the first guiding post 4A engaged with the first guiding groove 3A in the length direction X and a projection of a central axis d of the second guiding post 4B engaged with the second guiding groove 3B in the length direction X are staggered from each other at the distance x. In this way, the two guide slots 3A, 3B displaced in the length direction X can simultaneously achieve the guiding effect in the length direction X.

In the shown embodiment, the first guiding groove 3A and the second guiding groove 3B are elongated holes, and a longitudinal direction of the first guiding groove 3A and a longitudinal direction of the second guiding groove 3B are parallel to the width direction Y of the body 1. It should be noted that, in some other embodiments of the present disclosure, the first and second guiding grooves 3A, 3B may also be circular holes or oval holes, or the like.

In the embodiment shown in FIGS. 1-3, the first guiding groove 3A and the second guiding groove 3B are different in structure. The first guiding groove 3A has a cross section of a U-shape with an opening toward the body 1. The second guiding groove 3B has a cross section of a U-shape with an opening away from the body 1. However, it should be noted that, in some other embodiments of the present disclosure, the first guiding groove 3A and the second guiding groove 3B may also adopt other different structures, for example, the first guiding groove 3A is a circular hole and the second guiding groove 3B is a square hole.

As shown in FIGS. 1 and 2, a first connecting portion 6 is formed between the guiding post 4B and the body 1, and the size of the first connecting portion 6 in the width direction Y is smaller than that of the second guiding post 4B in the width direction Y. Correspondingly, an opening 7 for receiving the first connecting portion 6 is formed on a side of the second guiding groove 3B close to the body 1.

A second connecting portion 5, shown in FIGS. 1 and 2, is formed between a sidewall of the first guiding groove 3A and a sidewall of the second guiding groove 3B, to enhance the stability of the connector 100.

In an embodiment, the housing is integrally formed, for example, it may be formed of plastic material by injection molding in order to reduce manufacturing costs.

A connector assembly according to an embodiment includes two identical connectors 100, 100'. Each of the connectors 100, 100' includes a housing and a terminal 2 held in the housing, as described above. The housing includes a body 1 and at least one guiding structure. The body 1 has a first end along a length direction X thereof and a second end opposite to the first end. Each guiding structure includes a guiding groove 3 and a guiding post 4. The guiding groove 3 formed at the first end of the body 1 extends in a direction perpendicular to the body 1. The guiding post 4 is formed at the second end of the body 1.

When the two connectors 100, 100' are mated with each other, the guiding post 4 of any one 100 (100') of the two connectors is adapted to engage with the guiding groove 3 of the other connector 100' (100), to achieve the guiding effect. That is, the guiding post 4 of the connector 100 is adapted to engage with the guiding groove 3 of the other connector 100', and the guiding groove 3 of the connector 100 is adapted to engage with the guiding post 4 of the other connector 100', to achieve the guiding effect. Since the guiding post 4 and guiding groove 3 adopt a staggered design, space is saved. In addition, since the connector 100, 100' has a hermaphroditic structure, there is no need to manufacture two different connectors for mating, which reduces the manufacturing cost of the connector.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the present disclosure has been described hereinbefore in detail with reference to the accompanying drawings, it should be appreciated that the disclosed embodiments in the accompanying drawings are intended to illustrate embodiments of the present disclosure by way of example, and should not be construed as limiting the present disclosure.

Although some embodiments of the general inventive concept of the present disclosure have been shown and described, it would be appreciated by those skilled in the art that changes or modification may be made to these embodiments without departing from the principles and spirit of the general inventive concept, the scope of which is defined in claims and their equivalents.

What is claimed is:

1. A housing of a connector, comprising:

a body having a first end and a second end opposite the first end in a length direction;

a guiding structure including a first guiding groove and a second guiding groove at the first end of the body and extending perpendicular to the body and a first guiding post and a second guiding post at the second end of the body, each guiding groove is complementary to one guiding post and has a shape corresponding to one guiding post; and a second connecting portion between a sidewall of the first guiding groove and a sidewall of the second guiding groove, the second connecting portion is complementary to a connecting portion opening between a sidewall of the first guiding post and a sidewall of the second guiding post and has a shape corresponding to the connecting portion opening.

2. The housing of claim 1, wherein the first guiding groove and the second guiding groove are arranged in a width direction of the body.

3. The housing of claim 2, wherein a projection of a central axis of the first guiding groove in the length direction and a projection of a central axis of the second guiding groove in the length direction are staggered from each other.

4. The housing of claim 3, wherein the first guiding groove and the second guiding groove are elongated holes, a longitudinal direction of each of the first guiding groove and the second guiding groove is parallel to the width direction.

5. The housing of claim 4, wherein the first guiding groove and the second guiding groove are different in structure.

6. The housing of claim 5, wherein the first guiding groove has a cross-section of a U-shape open toward the body.

7. The housing of claim 6, wherein the second guiding groove has a cross-section of a U-shape opening away from the body.

8. The housing of claim 1, further comprising a first connecting portion between the guiding post and the body.

9. The housing of claim 8, wherein an opening shaped to receive the first connecting portion is formed on a side of the guiding groove adjacent to the body.

10. The housing of claim 8, wherein a size of the first connecting portion is smaller than a size of the second guiding post in a width direction of the body.

11. The housing of claim 1, wherein the body is integrally formed with the guiding structure.

12. The housing of claim 1, wherein one of the first guiding groove or the second guiding groove is a circular hole and the other is a square hole.

13. The housing of claim 1, wherein the first guiding groove and the second guiding groove are elongated holes both extending through the body of the housing.

14. A connector, comprising:

a housing including a body, a guiding structure, and a second connecting portion, the body having a first end and a second end opposite the first end in a length direction, the guiding structure including a first guiding groove and a second guiding groove at the first end of the body and extending perpendicular to the body and a first guiding post and a second guiding post at the second end of the body, each guiding groove is complementary to one guiding post and has a shape corresponding to one guiding post, the second connecting portion is between a sidewall of the first guiding groove and a sidewall of the second guiding groove, the second connecting portion is complementary to a connecting portion opening between a sidewall of the first guiding post and a sidewall of the second guiding post and has a shape corresponding to the connecting portion opening; and a terminal held in the housing.

15. A connector assembly, comprising:

a connector including a housing having a body, a guiding structure, and a second connecting portion, the body having a first end and a second end opposite the first end in a length direction, the guiding structure including a first guiding groove and a second guiding groove at the first end of the body and extending perpendicular to the body and a first guiding post and a second guiding post at the second end of the body each guiding groove is complementary to one guiding post and has a shape corresponding to one guiding post, the second connecting portion is between a sidewall of the first guiding groove and a sidewall of the second guiding groove, the second connecting portion is complementary to a connecting portion opening between a sidewall of the first guiding post and a sidewall of the second guiding post and has a shape corresponding to the connecting portion opening.

16. The connector assembly of claim 15, further comprising another connector identical to the connector and to be mated with the connector.

17. The connector assembly of claim 16, wherein, when the connector is mated with the another connector, the guiding post of the connector engages the guiding groove of the another connector.

18. The connector assembly of claim 17, wherein, when the connector is mated with the another connector, the guiding post of the another connector engages the guiding groove of the connector.

19. The connector assembly of claim 15, wherein the guiding groove of the connector includes a first guiding groove and a second guiding groove arranged in a width direction of the body.

20. The connector assembly of claim 19, wherein a projection of a central axis of the first guiding groove in the length direction and a projection of a central axis of the second guiding groove in the length direction are staggered from each other.

21. The connector assembly of claim 15, wherein the housing is integrally formed with the body and the guiding structure.

22. The connector assembly of claim 15, wherein the connector includes a terminal held in the housing.

* * * * *